(12) United States Patent
Wilson

(10) Patent No.: US 6,365,277 B1
(45) Date of Patent: Apr. 2, 2002

(54) WINDOW FOR MOTOR VEHICLE

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/701,038

(22) PCT Filed: May 20, 1999

(86) PCT No.: PCT/US99/11110

§ 371 Date: Nov. 22, 2000

§ 102(e) Date: Nov. 22, 2000

(87) PCT Pub. No.: WO99/61237

PCT Pub. Date: Dec. 2, 1999

Related U.S. Application Data

(60) Provisional application No. 60/086,598, filed on May 20, 1999.

(51) Int. Cl.[7] .............................................. B32B 27/36
(52) U.S. Cl. ...................................................... 428/412
(58) Field of Search .......................................... 428/412

(56) References Cited

U.S. PATENT DOCUMENTS 5,569,700 A  10/1996  Iwakiri et al. .............. 524/504
5,733,659 A   3/1998  Iwakiri et al. .............. 428/412

OTHER PUBLICATIONS

Derwent Abstract, 1997–259217. WO 97/15935 A1, May 1, 1997.
Derwent Abstract, 1996–225189. JP 08085749 A, Apr. 2, 1996.

*Primary Examiner*—Terressa M. Boykin
(74) *Attorney, Agent, or Firm*—Pillsbury Winthrop LLP

(57) ABSTRACT

A window for a motor vehicle includes transparent polycarbonate plastic material and reinforcement particles dispersed within the polycarbonate plastic material. The reinforcement particles constitute less than 10% of the total volume of the window. At least 50% of the reinforcement particles have a thickness of less than 10 nanometers. The reinforcement particles are selected and configured such that the window has a transmittance of visible light which is at least 95% of the transmittance of visible light that would exist through the window in the absence of the reinforcement particles.

12 Claims, 1 Drawing Sheet

WINDOW FOR MOTOR VEHICLE

No. 60/086,596 is a provisional of PCT/US99/11110 May 20, 1999.

FIELD OF THE INVENTION

This invention relates to a window for a motor vehicle. In particular, this invention relates to an improved polycarbonate window for a motor vehicle.

BACKGROUND OF THE INVENTION

Motor vehicle windows, by and large, have heretofore been made from glass. It would be desirable to manufacture motor vehicle windows from a polycarbonate material, which is much lighter than glass. While use of polycarbonate plastic material has been acceptable for certain applications, such as for commercial bus windows, its lack of durability has precluded polycarbonate material from widespread use in passenger cars. In particular, conventional polycarbonate plastic material is subject to scuffing and marring during manufacture and at point of use. In addition, the desired stiffness could only be achieved with undesirably thick polycarbonate windows. Any attempt to reinforce the polycarbonate material has resulted in commercially unacceptable hazing or reduction in the transparency of the window. While Federal Motor Vehicle Safety Standard (FMVSS) 205 requires simply that vehicle windows to have at least 70% transmittance of visible light, the type of hazing that would result from conventional reinforcements would be aesthetically unappealing.

SUMMARY OF THE INVENTION

The disadvantages of the prior art may be overcome by providing a window for a motor vehicle comprising transparent polycarbonate plastic material and reinforcement particles dispersed within the polycarbonate material. The reinforcement particles comprise less than 10% of a total volume of the window. At least 50% of the reinforcement particles have a thickness of less than 10 nanometers. The reinforcement particles are selected and configured such that the window has a transmittance of visible light which is at least 95% of the transmittance of visible light that would exist through the window in the absence of the reinforcement particles.

It is a further object of the present invention to provide a window comprising a transparent thermoplastic material selected from the group consisting of polycarbonate and acrylic, and reinforcement particles dispersed within the thermoplastic material. The reinforcement particles comprise less than 10% of a total volume of the window. At least 50% of the reinforcement particles have a thickness of less than 10 nanometers. The reinforcement particles are selected and configured such that the window has a transmittance of visible light which is at least 95% of the transmittance of visible that would exist through the window in the absence of the reinforcement particles.

Because the nanoparticles are smaller than the wavelength of visible light, they are individually invisible to the naked eye. As a result, the nanoparticles can be impregnated into the polycarbonate or acrylic at loadings of preferably less than 10% by volume of the total volume of the window, and with particle sizes of preferably less than 10 nanometers in average thickness, without any appreciable decrease in transparency. In addition, the stiffness and scratch resistance of the window is greatly improved. Specifically, the stiffness can be improved by a factor of 1.5–4.0× in comparison with unreinforced parts. In addition, scuff or mar resistance can also be improved by a factor of between about 1.4–4.0×. In addition, impact resistance can be improved or maintained while reducing the window's thickness.

DETAILED DESCRIPTION OF THE PRESENT INVENTION

Figure 1:
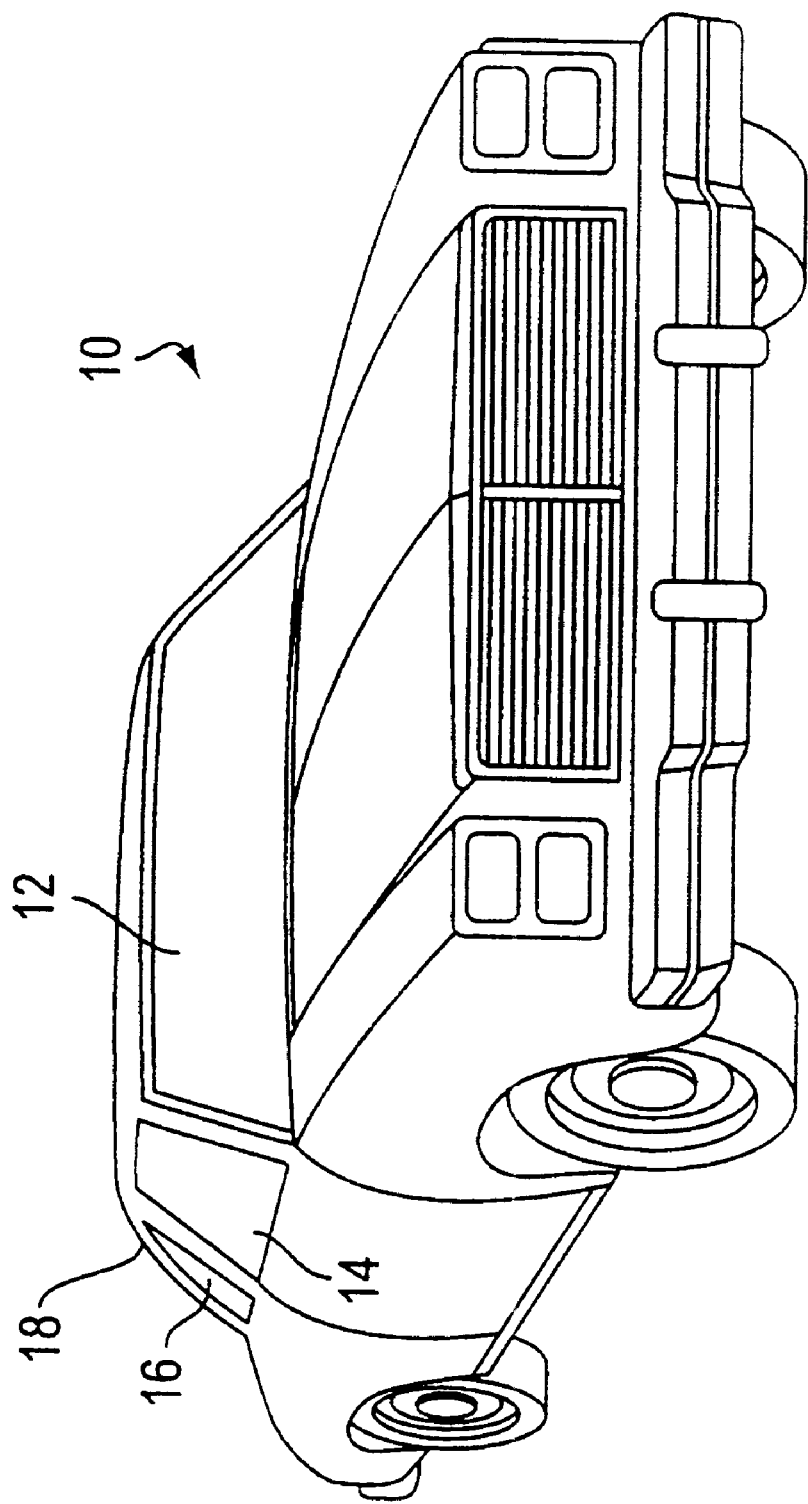
FIG. 1 is a perspective view of a window manufactured in accordance with the present invention, shown installed in a motor vehicle.

The automobile window manufactured in accordance with the present invention comprises a composite material of a polycarbonate having disbursed therein reinforcement fillers in the form of very small mineral reinforcement particles. The reinforcement filler particles, also referred to as "nanoparticles" due to the magnitude of their dimensions, each comprise one or more generally flat platelets. Generally, the platelets have a thickness of between about 0.7 to about 1.2 nanometers. The average platelet thickness is approximately 1 nanometer thick. The preferred aspect ratio (which is the largest dimension divided by the thickness) for each particle is about 50 to about 300.

The platelet particles or nanoparticles are derivable from larger, layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadiite, and kenyaite. Mixed Mg and Al hydroxides may also be used. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The composites of the present invention are prepared by combining the platelet minerals with the desired polycarbonate plastic in the desired ratios as discussed below. The components can be blended by general techniques known to those in the art. For example, the components can be blended and then melted in mixers or extruders.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190. Additional background is included in the following references: U.S. Pat. Nos. 4,739,007 and 5,652,284.

The exfoliation of layered mineral particles into constituent layers need not be complete in order to achieve the objects of the present invention. The present invention contemplates that at least 50% of the particles should have a thickness of less than 10 nanometers to achieve desired reinforcement and only a slight decrease in visible light transmittance through the polycarbonate host. As the percentage of particles having a thickness of less than 10 nanometers increases, so does the visible light transmittance. In addition, a decrease in the average particle thickness will also increase visible light transmittance. In any event the reinforcement particles are selected, sized, and configured such that the final composite window will have a transmittance of visible light which is at least 95% of the transmittance of visible that would exist through the window in the absence of the reinforcement particles. Otherwise stated, the decrease in visible light transmittance is less than 5% in comparison with an identical polycarbonate window prepared without such reinforcing particles.

In an even more preferred window, at least 70% of the particles have a thickness of less than 5 nanometers to achieve even better reinforcement and an even smaller decrease in visible light transmittance. It is also preferable for at least 99% of the particles to have a thickness of less than about 30 manometers. Particles having more that 30 layers act as stress concentrators and are preferably avoided to the extent possible. It is most preferable to have as many particles as possible to be as small as possible, ideally including only single platelets.

As noted above, the preferred aspect ratio (which is the largest dimension divided by the thickness) for each particle is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably at least 90% of the particles have an aspect ratio within the 100–200 range.

Generally, in accordance with the present invention, the composite polycarbonate window should contain an amount of reinforcement particles, which constitutes less than 10% by volume of the total volume of the window. If greater than 10% by volume of reinforcement filler is used, the viscosity of the composition becomes too high and thus difficult to mold. More preferably, 3–7% by volume is used, as this would provide most of the desired benefits, and would achieve even better light transmittance (e.g., better than 98% of the transmittance of visible light that would exist through the window in the absence of reinforcement particles). In any case, the balance of the window comprises polycarbonate plastic and suitable additives used in conventional polycarbonate windows.

Another advantage obtained in accordance with the present invention relates to the fact that use of the reinforcement particles in an amount in which the reinforcement particles comprise less than 10% of a total volume of the window, and wherein at least 50% of the reinforcement particles have a thickness of less than 10 nanometers, will result in a decrease in the coefficient of linear thermal expansion by a factor of 1.5–4.0× in comparison with conventional polycarbonate windows. As a result, the window becomes more dimensionally stable under different temperature conditions. This, in turn, provides the window with better sealing characteristics, as the windows position relative to, for example, a rubber based sealing member becomes more predictable.

The use of the nanoparticle reinforcing material also greatly improves the surface toughness of the polycarbonate material so as to improved the durability and scuff/mar resistance.

A front window manufactured in accordance with the present invention is illustrated in FIG. 1 and designated by reference numeral 12. The window 12 is shown installed in a motor vehicle, designated by reference numeral 10. It should be appreciated that side windows 14 and 16 and a rear window 18 may also be made in accordance with the materials of the present invention.

It should be noted that similar benefits may be achieved in other plastic glazing, materials, such as acrylic resins used for architectural applications. Architectural glazings would enjoy the same benefits of reduced thickness required, reduced weight to be supported, and improved durability.

It should be appreciated that the foregoing description is illustrative in nature and that the present invention includes modifications, changes, and equivalents thereof, without departure from the scope of the invention.

What is claimed is:

1. A window for a motor vehicle comprising transparent polycarbonate plastic material and reinforcement particles dispersed within the polycarbonate plastic material, said reinforcement particles comprise less than about 10% of a total volume of the window, at least 50% of the reinforcement particles having a thickness of less than about 10 nanometers, said reinforcement particles being selected and configured such that the window has a transmittance of visible light which is at least 95% of the transmittance of visible light that would exist through the window in the absence of the reinforcement particles, said reinforcement particles comprising one or more mineral platelet layers.

2. A window according to claim 1, wherein at least 70% of the particles have a thickness of less than about 5 nanometers.

3. A window according to claim 2, wherein at least 99% of the particles have a thickness of less than about 30 nanometers.

4. A window according to claim 3, wherein at least 80% of the particles have an aspect ratio of between about 50 to about 300.

5. A window according to claim 4, wherein at least 90% of the particles have an aspect ratio of between about 100 to about 200.

6. A window according to claim 3, wherein said particles are of a material selected from a group consisting of montmorillonite, vermiculite, hectorite, saponite, hydrotalcites, kanemite, sodium octosilicate, magadiite, and keyaite.

7. A window comprising a transparent thermoplastic material selected from the group consisting of polycarbonate and acrylic, and reinforcement particles dispersed within the thermoplastic material, the reinforcement particles comprise less than 10% of a total volume of the window, at least 50% of the reinforcement particles have a thickness of less than 10 nanometers, the reinforcement particles selected and configured such that the window has a transmittance of visible light which is at least 95% of the transmittance of visible light that would exist through the window in the absence of the reinforcement particles, said reinforcement particles comprising one or more mineral platelet layers.

8. A window according to claim 7, wherein at least 70% of the particles have a thickness of less than about 5 nanometers.

9. A window according to claim 8, wherein at least 99% of the particles have a thickness of less than about 30 nanometers.

10. A window according to claim 9, wherein at least 80% of the particles have an aspect ratio of between about 50 to about 300.

11. A window according to claim 10, wherein at least 90% of the particles have an aspect ratio of between about 100 to about 200.

12. A window according to claim 9, wherein said particles are of a material selected from a group consisting of montmorillonite, vermiculite, hectorite, saponite, hydrotalcites, kanemite, sodium octosilicate, magadiite, and kenyaite.

* * * * *

UNITED STATES PATENT AND TRADEMARK OFFICE
CERTIFICATE OF CORRECTION

PATENT NO.    : 6,365,277 B1
DATED         : April 2, 2002
INVENTOR(S)   : Wilson It is certified that error appears in the above-identified patent and that said Letters Patent is hereby corrected as shown below:

Column 1,
Line 2, please add the following immediately following the Title of the Invention:

-- Governmental Support and Interest:

The invention in this patent was made with Governmental support under Cooperative Agreement No. 70NANB7H3028 awarded to the Dow Chemical Company and Decoma International of America, Inc. (formerly Magna International of America, Inc.), project ID 1997-02-0047B, project name "NANOCOMPOSITES - NEW LOW COST/HIGH STRENGTH MATERIALS FOR AUTOMOTIVE PARTS," awarded September 30, 1997 by the United States Department of Commerce, National Institute of Standards and Technology, Advanced Technology Program. The Government has certain rights in this invention. --

Signed and Sealed this

Sixth Day of May, 2003

JAMES E. ROGAN
*Director of the United States Patent and Trademark Office*